United States Patent [19]

Purchase

[11] 3,822,414

[45] July 2, 1974

[54] SIGNAL TRANSMITTING COMPONENT

[75] Inventor: Francis Jack Purchase, Kitchener, Ontario, Canada

[73] Assignee: Autotelic Industries, Ltd., Ft. Erie, Ontario, Canada

[22] Filed: Apr. 19, 1972

[21] Appl. No.: 245,557

[52] U.S. Cl. .................................... 338/15, 338/19
[51] Int. Cl. ............................................ H01c 7/08
[58] Field of Search ............ 338/15, 19; 250/211 R, 250/220 M; 340/166 EL; 29/572; 252/501

[56] References Cited

UNITED STATES PATENTS

| | | | |
|---|---|---|---|
| 2,866,878 | 12/1958 | Briggs et al. | 338/15 X |
| 2,879,362 | 3/1959 | Meyer | 338/19 |
| 2,949,537 | 8/1960 | Kazan | 338/15 X |
| 3,248,261 | 4/1966 | Narken et al. | 338/15 X |
| 3,443,103 | 5/1969 | Lakshmanan | 338/15 X |

*Primary Examiner*—C. L. Albritton
*Attorney, Agent, or Firm*—John A. Young

[57] ABSTRACT

A component for emitting a detectable electrically developed signal at a signal emitting region in which a metal member is provided with a variable impedance connected thereto at a point spaced from the signal emitting region while the signal to be processed is supplied to the metal member through the impedance. The impedance is variable between high and low impedance conditions the signal transmission through the metal member is controlled. The variable impedance is in the form of a photosensitive resistor having a high ratio between the resistance when dark to the resistance when illuminated.

15 Claims, 7 Drawing Figures

SIGNAL TRANSMITTING COMPONENT

The present invention relates to a component for selectively emitting electrically developed signals and is particularly adapted for use in a display device.

Signal emitting devices can take the form of display devices which visibly display characters, symbols or continuous functions and quite often emit visible signals in the form of light. In other cases, a signal emitter may be required to emit a pattern of electrical signals in the form of pulses or the like. Heretofore, such devices have taken many forms that are usually characterized in being complex and expensive and are sometimes rather bulky and unreliable.

With the foregoing in mind, a primary objective of the present invention is the provision of a component for use in such devices in which the signal emitting characteristics of the component can readily be controlled.

Another object of the invention is the provision of a signal emitting component which can be manufactured quite inexpensively and which lends itself to incorporation in compact matrices.

Still another object of the invention is the provision of a component of the nature referred to which can be used as a signal emitting component and which can be made quite small and inexpensively and readily incorporated in a matrix with a plurality of other like components.

The foregoing objects, as well as still other objects and advantages of the present invention will become more apparent upon reference to the following detailed specification taken in connection with the accompanying drawings in which.

BRIEF SUMMARY OF THE INVENTION

According to the present invention, an electrically conductive member is provided, preferably metal, for emitting detectable signals, as from one end thereof. At the other end of the element, there is an electrode by means of which signals are supplied to the member.

A variable impedance is interposed between the electrode and other end of the member and preferably takes the form of a photosensitive resistor. The photosensitive resistor is characterized in a high ratio between the resistance when dark and the resistance when illuminated.

DETAILED DESCRIPTION OF THE INVENTION

Figure 1:
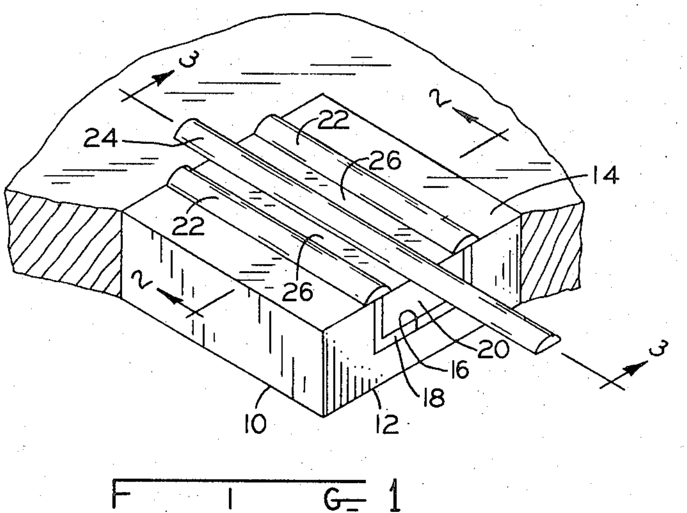
FIG. 1 is a somewhat schematic perspective view showing a component according to the present invention sealingly and insulatingly mounted in a supporting panel which could form a portion of a matrix panel.

Referring to the drawings somewhat more in detail, FIG. 1 shows a metal element 10 which may be in the form of a cube or a cylinder and which has one end 12 adapted to emit signals. If end 12 of the element is spaced from an anode with a neon gas interposed therebetween, the gas will glow in the region of end 12 of member 10 when an electrical signal of predetermined strength is supplied to member 10.

Opposite the end 12 of member 10 is an end 14 which has a recess 16 therein which may be in the form of a groove extending laterally across member 10. The bottom and side walls of groove 16 are provided with a layer of electrical insulating material 18. Advantageously, member 10 is aluminum and insulating layer 18 is obtained by anodizing member 10 in that region.

Disposed in recess 16 is a body 20 of photoconductive material. This material is preferably a polycrystalline material in the form of a compound of cadmium and selenium with suitable doping agent means entrained therein, for example, in the form of copper or chlorine. Cadmium selenium is by way of illustration, a suitable polycrystalline material; but this is mentioned not by limitation but by way of example, without intending to limit the invention. The material is suspended in a light conductive matrix, transparent plastic, for example, with the crystals present in sufficient concentration to form a continuous phase in the matrix. The invention further contemplates a thin film material either polycrystalline or monocrystalline and the thin film can be sputter deposited or straight vacuum deposited, all of these being within the scope of the present invention. The thin film can be also epitoxially grown on a substrate. These additional embodiments will contribute to the speed of response of the photoconductors.

The body 20 is electrically connected to member 10 along the side edges of groove 16 by conductive strips 22 which bridge over the edges of insulating layer 18.

An electrode strip 24 extends over body 20, preferably in about the center thereof and is electrically connected to body 20. The arrangement of the electrode strip 24 and the connector strip 22 exposes strips 26 of the surface of body 20 for illumination.

Upon the supply of an electric signal to electrode 24, if body 20 is dark, the high resistance thereof prevents the signal from reaching end 12 of member 10 with sufficient strength to cause a signal to be emitted at end 12. However, if the exposed strips 26 of body 20 are illuminated, the resistance of body 20, at least in the region of the illuminated portion thereof will reduce substantially and an effective signal will reach end 12 of body 10.

Figure 2:
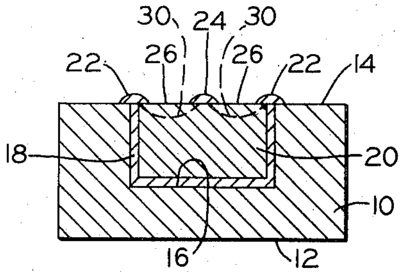
FIG. 2 is a sectional view indicated on line II—II of FIG. 1.
Figure 3:
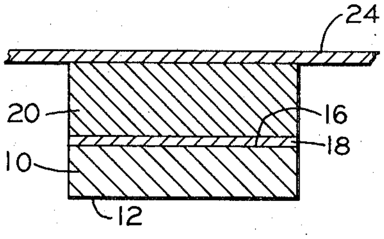
FIG. 3 is a sectional view indicated on line III—III of FIG. 1.

The region of the body 20 which becomes relatively freely conductive when the surface areas 26 are illuminated is indicated by the dotted lines 30 (FIG. 2).

It has been found that the photosensitive material referred to, and consisting of a compound of cadmium and selenium, namely, cadmium selenate, in the form of small crystals carried in a transparent plastic vehicle, such as epoxy and in sufficient concentration in the plastic material to cause the individual particles to engage one another gives a highly sensitive photosensitive element which responds extremely rapidly to changes in illumination.

The conductivity of such a photosensitive element can be 200 times as much when the element is illuminated as when the element is dark and this provides for a pronounced difference in the strength of the signal delivered to the signal emitting end 12 of member 10.

As mentioned, member 10 can be made small enough so that a plurality thereof can be combined to form a matrix, or array of the members. For example, the member could be as small as a few hundreds of an inch on a side and the body 20 can also be quite small due to the aforementioned high ratio between light and dark conductivity rates.

A particular feature of the arrangement illustrated is that the conductive strips 22 and the electrode 24 can readily be controlled as to width, thereby controlling the size of the exposed areas 26 of body 20 and thus controlling the characteristics of the component.

Figure 4:
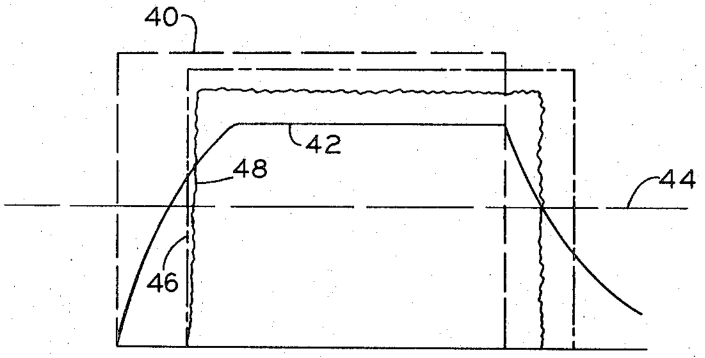
FIG. 4 is a graph showing the electrical characteristics of the component of FIGS. 1 to 3.

FIG. 4 is a graph in which the dashed line 40 represents illumination supplied to end 14 of member 10. Solid line 42 shows the current flowing through body 20 in the presence of a voltage applied thereacross.

Assuming that end 12 is to ionize a gas, horizontal line 44 represents the level of the signal strength to produce ionization. Dot-dash line 46 indicates the signal applied to electrode 24 and line 48 indicates the light display which will develop at end 12 of member 10. It will be noted that the light display terminates where line 42 intersects line 44.

By initiating the signal represented by line 46 after line 42 has risen above line 44, the initiation of the light display becomes quite sharp and the light display then terminates quite sharply when line 42 again intersects line 44.

Figure 5:
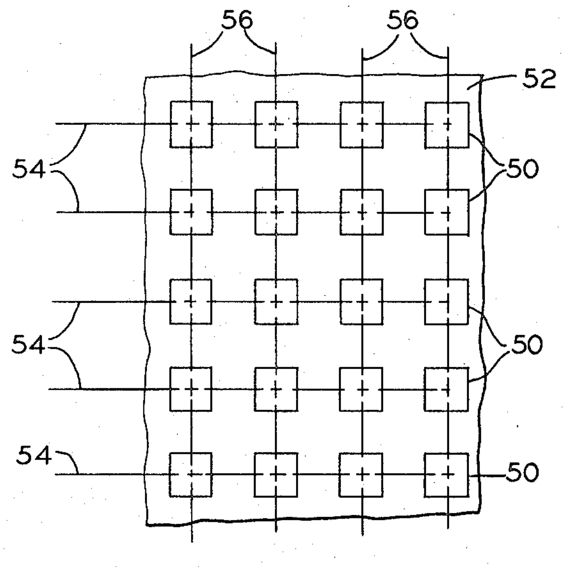
FIG. 5 is a schematic view showing components according to the present invention arranged in matrix form.

FIG. 5 shows how a plurality of the components, indicated at 50, could be mounted in a matrix panel 52 in columns and rows. Each row is provided with an electrode 54 and each column is provided with illuminating means 56. By sequentially energizing illuminating means 56 and sequentially supplying signal pulses to electrodes 54, any desired pattern of signals can be developed at the signal emitting ends of members 50.

Figure 6:
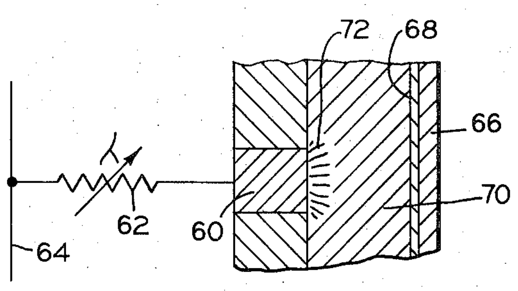
FIG. 6 is a schematic view showing a component according to the present invention arranged to develop a light signal.

In FIG. 6, a component according to the present invention and comprising metal member 60 and light sensitive resistor 62 is connected to an electrode 64. The end of member 60 opposite resistor 62 is spaced from a glass panel 66 having a transparent tin oxide film 68 on the side facing member 60. The space 70 contains neon gas and when resistor 72 is illuminated and a signal is supplied to electrode 64 a glow discharge 72 develops at the end of member 60 facing panel 66.

Figure 7:
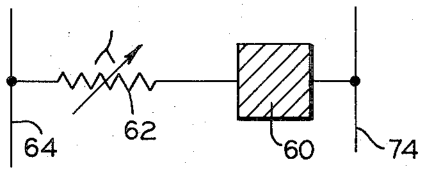
FIG. 7 is a schematic view showing a component according to the present invention arranged to emit electrical signals.

In FIG. 7, the free end of member 60 is connected to a wire 74 to supply electrical signals thereto when electrode 64 is energized and resistor 62 is illuminated.

What is claimed is:

1. A component adapted for transmitting electrical signals and comprising: a member of electrically conductive material having a first area for emitting signals and having a second area remote from said first area, an electrode adjacent said second area, and adjustable impedance means electrically interposed between said electrode and said second area.

2. A component according to claim 1 in which said adjustable impedance comprises a photosensitive resistor.

3. A component according to claim 1 in which said member is metal, said component having a recess therein at said second area, and said variable impedance means comprising a body of photoconductive material mounted in said recess and insulated from the walls thereof.

4. A component according to claim 1 in which said member is a metal member and said first area is one end thereof and said second area is the other end thereof, a groove in said other end of said member, a body of photoconductive material mounted in said groove and forming said variable impedance, an insulating layer between said body and the walls of said groove, conductive strip means connecting at least one side region of said body to said metal member, and said electrode being connected to said body at a point spaced from said conductive strip means.

5. A component according to claim 1 in which said member is a metal member and said first area is one end thereof and said second area is the other end thereof, a groove in said other end of said member, a body of photoconductive material mounted in said groove and forming said variable impedance, an insulating layer between said body and the walls of said groove, electrically conductive strips bridging between said body and said member along the side edges of said groove, said electrode extending parallel to said strips and electrically connected to said body, said body having exposed surface areas between said conductive strips and said electrode adapted to be illuminated to control the conductivity of said body.

6. A component according to claim 1 in which said variable impedance comprises particles of cadmium selenite in a transparent plastic matrix.

7. A component according to claim 6 in which said cadmium selenite includes at least one doping agent.

8. A component according to claim 3 in which said metal is aluminum and the walls of said recess are anodized to provide the electrical insulation between said body and said member.

9. A photosensitive resistor comprising contiguously disposed particles of cadmium selenite, a body of light-conducting material wherein said particles are carried at the surface of the body to provide a continuous phase of said cadmium selenite adapted to substantially increase the speed of response of the resistor in the surface mode of electrical conduction responsively to light passing through the light conducting material.

10. A photosensitive resistor in accordance with claim 9 in which said light conducting material is transparent to enable light to penetrate the surface thereof and effecting an increase in speed of response.

11. A photosensitive resistor in accordance with claim 9 in which said material forms part of a vacuum seal.

12. A photosensitive resistor in accordance with claim 9 in which said light conducting material is machineable while substantially maintaining the photosensitive responsiveness of such material.

13. A photosensitive resistor according to claim 9 in which said light conducting material is of plastic composition.

14. A photosensitive resistor in accordance with claim 9 in which said cadmium selenite includes a doping agent selected from the class consisting of copper and chlorine.

15. A photosensitive resistor according to claim 9 in which said cadmium selenite is synthesized to be substantially free of hydrogen, oxygen, and reaction products thereof and includes at least one doping agent in an addition thereto.

* * * * *